Jan. 23, 1951          T. A. ST. CLAIR          2,538,806

QUICK-CLOSING VALVE AND STORAGE TANK CONTAINING SAME

Filed June 11, 1945          2 Sheets-Sheet 1

INVENTOR
T. A. ST CLAIR
BY Hudson & Young
ATTORNEYS

INVENTOR
T. A. ST CLAIR
BY Hudson & Young
ATTORNEYS

Patented Jan. 23, 1951

2,538,806

UNITED STATES PATENT OFFICE 2,538,806

QUICK CLOSING VALVE AND STORAGE TANK CONTAINING SAME

Theodore A. St. Clair, Bartlesville, Okla., assignor to Phillips Petroleum Company, a corporation of Delaware Application June 11, 1945, Serial No. 598,812

11 Claims. (Cl. 62—1)

This invention relates to apparatus for handling liquids. In one more specific aspect it relates to a system for handling liquefied gases. In another more specific aspect it relates to a quick closing valve suitable for use in such a system. In another more specific aspect it relates to a system for pumping liquefied gases in and out of a storage tank, and for dispensing said liquid. The specific quick closing valves per se are now claimed in my copending continuation-in-part application, Serial No. 185, filed January 2, 1948, for "Quick Closing Valve."

From a standpoint of safety it is essential that all connections to liquefied petroleum gas containers be protected as much as possible from the results of mechanical damage. Under a few special circumstances it is entirely possible to assemble the various tank outlets with their valves and fittings into a relatively small area and protect the assembly with a heavy guard. However on most mobile and on some stationary equipment it is necessary to have pipe lines located in areas which will be vulnerable to breakage through collision. It is standard practice in the industry then (and regulations are set up by various governing bodies) to equip each and every connection to the tank, with the exception of the safety relief valve, with either an excess flow valve which will automatically close when a certain predetermined flow is reached or a back flow check valve which is normally closed and which can only be opened when the pressure in the line is substantially greater than the pressure in the tank. Obviously when back flow check valves are recessed well within the tank proper so that they will not in themselves be damaged, very adequate protection against line breakage is afforded. However excess flow valves are normally open and can only be closed when a certain predetermined flow is reached. There are a number of practical obstacles which might limit the flow through an excess flow valve and prevent its proper functioning. These all resolve to terms of pressure drop. For instance a given flow will produce a given pressure drop through the excess flow valve and the tubing. Should the differential pressure between the tank and atmosphere be less than the pressure drop in the pipe line the excess flow valve will not close but will continue to flow whatever amount this differential pressure will permit. Even with a relatively high tank pressure, a small break in a line might not permit an excess flow valve to function since the pressure drop across the point of breakage might too greatly limit the flow. The above remarks have been written in the "conditional" tense, but these failures have been recurring far too frequently. The intent of the present invention is to provide a normally closed valve which is controlled and which is open only when a pumping operation is in progress (when connections are intact and are much less subject to breakage).

The primary object of this invention is to provide safe equipment for handling liquefied gases, that will be as safe as can be devised, and that will comply with the "Standards of the National Board of Fire Underwriters NBFU Pamphlet No. 58" and all similar standards of safety.

Another object is to provide a suitable system for handling liquefied gases.

Another object is to provide a suitable quick closing valve to use in such a system.

Another object is to provide in combination with a storage tank a safe system for supplying liquid to the tank, and dispensing liquid from the tank.

Numerous other objects and advantages will be apparent to those skilled in the art upon reading the accompanying specification, claims and drawings.

Figure 1:
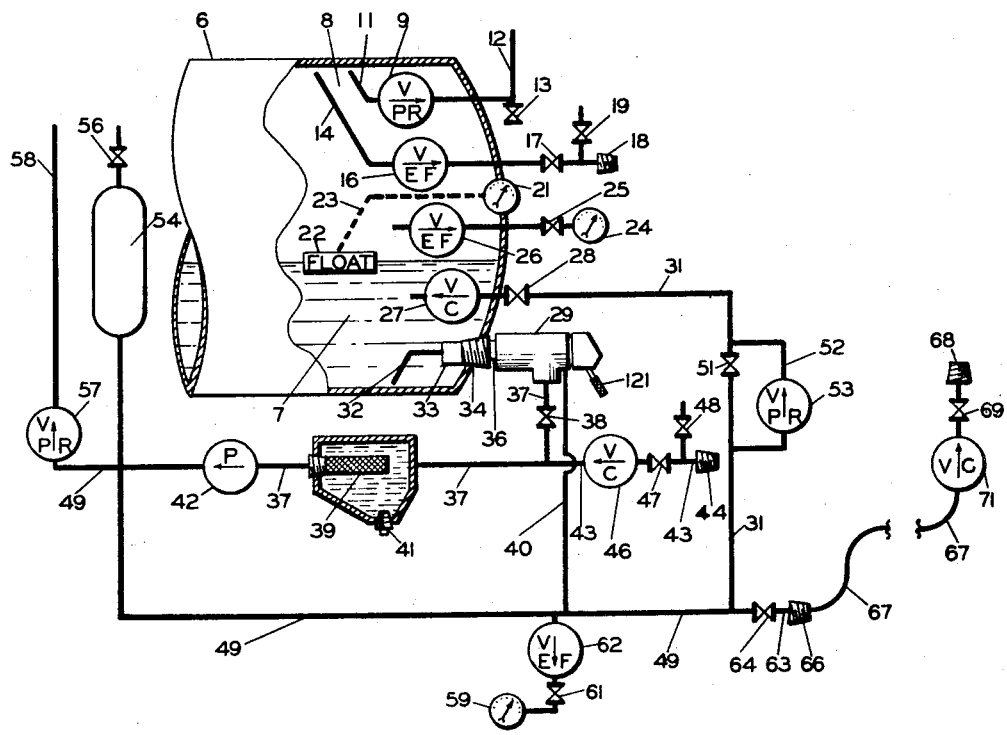
Figure 1 is a diagrammatic elevational view with parts broken away of a storage tank and liquid handling system embodying my invention.

In Figure 1 a storage tank 6 is provided for storing liquefied gas 7 and such vapors 8 as may be present thereover. This tank may or may not be provided with the conventional devices mentioned in the next paragraph.

Tank 6 may be provided with a vapor pressure relief valve 9 preferably located so as to draw vapor from the top of tank 6 through line 11 whenever the pressure inside tank 6 exceeds a predetermined safe pressure and venting said vapors through vent line 12 to the atmosphere. A drain valve 13 may be provided to drain liquids from line 12. Vapor may also be withdrawn from or added to space 8 by line 14 through an excess flow valve 16 and a shut-off valve 17 which may lead to another tank (not shown) which may be connected to coupling 18. Before uncoupling at 18, it is customary to bleed off the gas between valve 17 and the coupling 18 through bleed valve 19. Tank 6 may also be provided with any known type of liquid level gauge 21, the type shown being a magnetic type gauge in which there is no opening through the tank wall of tank 6 but instead in which there is a brass plate in the tank wall through which float 22 transmits the level of liquid 7 by means of a linkage 23 containing a permanent magnet having a magnetic field which moves the steel indicating needle of gauge 21 right through the brass plate (not shown). When any other type of liquid level gauge is used, the usual protective devices customarily accompanying that gauge are preferably also employed. The pressure in tank 6 may be measured by a pressure gauge 24 which may be provided with the usual shut-off valve 25 and the usual excess flow valve 26. Valves 9, 16, 26, and 27 are shown inside of tank 6 and they are actually mounted either inside tank 6 or in the wall of tank 6 so that they cannot be sheared off of tank 6 or otherwise rendered inoperative in case of some accidental force being exerted on the exterior of tank 6. It is also customary to provide a protective housing or guard ring (not shown) for such exterior elements as valves 13, 17, 25, 28 and 29 but this protective housing may be eliminated and has therefore not been shown.

A pressure relief valve such as 9 is one that permits transmission of fluid therethrough when a predetermined differential in pressure exists across said valve. An excess flow valve such as 16 may be like Figure 1 of the U. S. patent to Thomas 2,121,936 of June 28, 1938, or any standard excess flow valve and remains open until a predetermined rate of flow exists through the valve whereupon the excess flow valve closes and at least substantially stops said flow. Some excess flow valves shut off the flow completely but many have a bleed passage allowing very minute flow for pressure equalization so the spring may reopen the valve. A check valve such as 27 permits flow in one direction only as indicated by the arrow.

Parts 9 to 26, inclusive, do not form any part of my present invention except that they may be advantageously employed in a storage tank also embodying my invention, but are not essential to the operation of my invention.

When the modification of my invention which employs a liquid return line is used, I prefer to have a check valve 27 and a cut-off valve 28 in said liquid return line 31, but it should be noted that many embodiments of my invention need not employ any liquid return line 31 and therefore do not employ check valve 27 nor cut-off valve 28 when line 31 is eliminated.

In order to remove liquid from tank 6 for dispensing or other purposes, a liquid eduction line 32 may be employed to get liquid from as low in the tank as possible. However, eduction line 32 may be omitted.

A quick closing valve 33 is employed in all modifications of my invention and is secured in the wall of the tank 6 or inside said tank by coupling 34. While quick closing valve housing 29 is shown in Figure 1 as the modification of my invention shown in Figure 5, it is believed obvious that in place of housing 29 the other modified types of valves shown in Figures 2 and 3 could be substituted without any change in the system of pipes shown in Figure 1. Therefore, to reduce the number of drawings, only one assembled system is shown, and that is shown in Figure 1, it being understood that while the quick closing valve 29 of Figure 5 is shown therein that the term "quick closing valve" and other terms used in describing certain of the systems embodying my invention read also on the valves of Figures 2 and 3 as they are employed when used in the system shown in Figure 1, and I contemplate and claim such use.

Between the coupling 34 and housing 29, I may provide a reduced portion 36 which is structurally weaker than housing 29 so that an accidental force may shear off housing 29 at reduced portion 36 without injuring or rendering inoperative the quick closing valve 33.

Attached to housing 29 is a continuation of eduction line 32 which is numbered 37. I may insert a cut-off valve 38 in line 37, the operation of which is described later.

A strainer 39 may be inserted in line 37 and may be provided with a drain plug 41. Line 40 will be described when describing line 49.

Line 37 is attached to the intake side of pump 42 which may be any of the usual type of liquid pumps.

A liquid supply line 43 may be provided attached to line 37 and having the usual coupling 44 to provide a means for inserting liquid into tank 6. However, liquid supply line 43 and related parts may be eliminated if some other means is supplied (not shown) for placing liquid 7 in tank 6. When liquid supply line 43 is employed, I may employ a check valve 46, a shut-off valve 47 and a bleed valve 48 for purposes to be described later.

Attached to the discharge side of pump 42 is a dispensing line 49 which of course could be considered as a portion of return line 31. Connecting 49 and quick opening valve housing 29 is a pressure transmitting line 40.

Connected to dispensing line 49, in such modifications where a return line is employed, is return line 31, and a shut-off valve 51 may be employed in return line 31, in which case a by-pass line 52 may be employed connecting to return line 31 on both sides of valve 51, in which case I prefer to employ a pressure relief valve 53 in by-pass line 52 as shown.

On the exhaust side of pump 42, I may connect a surge chamber 54 to dispensing line 49. Chamber 54 may have a valve 56 for the insertion or removal of gases from chamber 54 where they act as a shock absorber to pulsations created by pump 42.

I may connect a pressure relief valve 57 to line 49 which may be provided with a vent pipe 58 to vent liquids or vapors to the atmosphere when a predetermined pressure in line 49 is reached.

I may measure the pressure in line 49 with a pressure gauge 59 and I may add as safety devices shut-off valve 61 and excess flow valve 62 in the line leading to the pressure gauge 59.

Dispensing line 49 is provided with an extension 63, preferably containing a shut-off valve 64, and may be provided with a coupling 66 and a flexible portion 67 ending in a dispensing end which may be provided with a coupling 68, a shut off valve 69 and a check valve 71.

Figure 2:
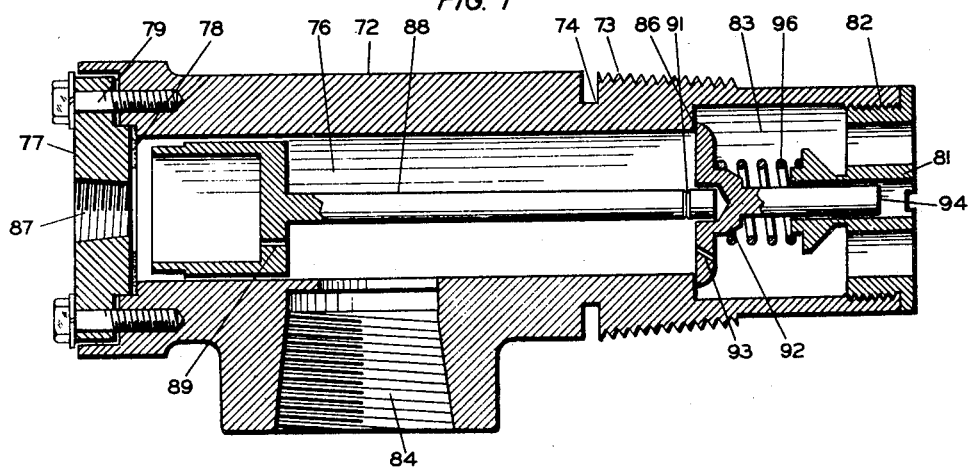
Figure 2 is a sectional elevational view of a first type of quick closing valve embodying my invention.

In Figure 2 is shown a quick closing valve housing 72 provided with exterior screw threads 73 and a weakened portion 74. Housing 72 contains a chamber 76 and housing 72 is made with a cover plate 77, gasket 78 and screws 79 for purposes of easy assembly and machining. At the other end of housing 72 is a screw spider 81 secured thereto by threads 82. Obviously whether parts 77 and 81 are detachable or not does not affect the invention but merely makes it easier to construct it.

Housing 72 is provided with an inlet 83, a chamber 76 and an outlet 84. The inlet 83 may be provided with a valve seat 86 and plate 77 may be provided with a pressure inlet 87.

When housing 72 is substituted for housing 29 in Figure 1, line 40 of Figure 1 is connected to 87 of Figure 2. Coupling 73 of Figure 2 is obviously inserted in place of coupling 34 of Figure 1; which places spider 81 inside tank 6; and connection 84 of Figure 2 is connected to line 37 of Figure 1.

Disposed in chamber 76 is a piston 88 which may have a bleed passage 89 and which may be weakened at 91 for purposes to be set forth later.

A quick closing valve head 92 is provided to cooperate with seat 86 and has a bleed passage 93. Head 92 may have a stem 94 guided in spider 81 and may be spring pressed to seat 86 by means of spring 96.

Figures 3, 4:
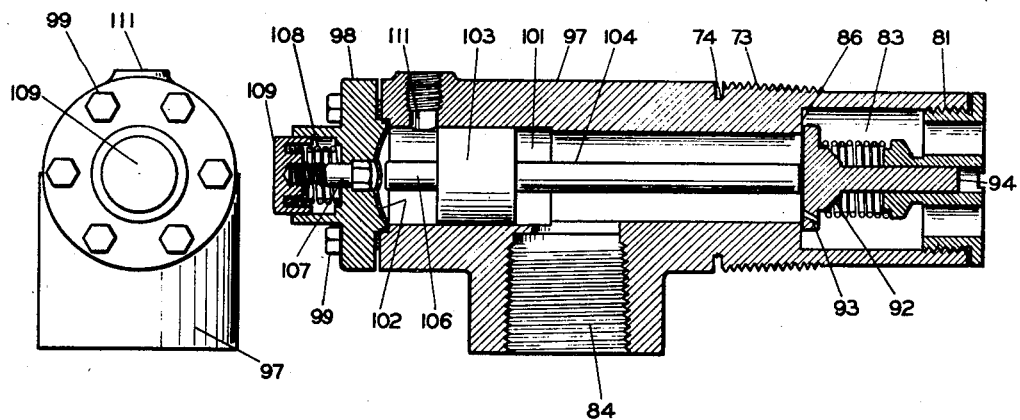
Figure 3 is a cross sectional elevational view of a modified second form of quick closing valve embodying my invention.
Figure 4 is an end view of Figure 3.
Figure 5:
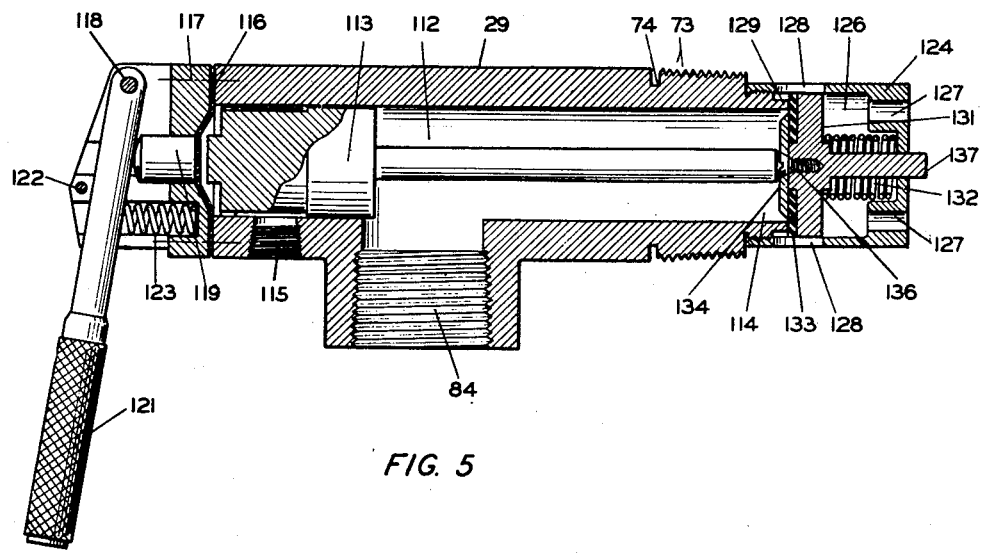
Figure 5 is an elevational sectional view of a third quick closing valve involving my invention.

In Figure 3 is shown a modified form of valve in which valve housing 97 is provided with many similar parts indicated by the same numbers employed in Figure 2. Housing 97 is also provided with a cap 98 secured thereon by bolts 99 and contains a chamber 101. One end of chamber 101 is formed by a flexible diaphragm 102 held in place by cap 98. In chamber 101 a piston 103 is provided having a piston rod 104 engaging the head of valve 92 and the other end of piston 103 has an extension 106 which may be engaged by a plunger 107. Plunger 107 is normally held away from extension 106 by spring 108 and is provided with a push button 109 for manual engagement. Chamber 101 is provided with a pressure fluid entrance 111.

When housing 97 is substituted for housing 29 of Figure 1, line 40 is connected to 111, line 37 to outlet 84 and screw threads 73 to replace 34 of Figure 1, placing inlet 83 inside tank 6.

Figure 4 does not show any arrangement not shown in Figure 3 but merely illustrates the device a little more fully by showing an end view thereof.

Figure 5 shows a further modified valve having a housing 29 having a chamber 112 in which is disposed a piston 113 and which chamber has an inlet 114 and an outlet 84. Said chamber also has a pressure inlet 115. A diaphragm of flexible material 116 forms one end of chamber 112 and is secured in place by a cap 117 having a pivot 118 secured thereto. A pin 119 is provided to engage piston 113 through diaphragm 116 and a lever 121 pivoted at 118 is provided to move pin 119. A stop pin 122 may be provided for lever 121 and a return spring 123 may be provided to urge lever 121 against pin 122.

In the other end of housing 29, a cap 124 may be provided having a chamber 126 and openings 127 and 128. Valve seat 129 is provided at the end of housing 29 on which a quick closing valve head 131 may seat to close inlet 114. Valve head 131 may be urged to its seat by spring 132 and the valve head may have a facing material 133 of a resilient nature retained in place by plate 134 and screw 136. Valve head 131 may have a valve stem 137 to guide it in its movement. When using housing 29 of Figure 5 in Figure 1 the threads 73 are screwed in tank 6 at 34 of Figure 1, outlet 84 is connected to line 37, and pressure inlet 115 is connected to pipe 40.

OPERATION

Several operations are possible employing various embodiments of my invention.

*Filling tank 6 with liquid in Figure 1—without pump*

Liquid may enter 44, pass through valve 38, through automatic valve 29 and into the tank (pressure opens the valve at seat). Filling without the pump is the procedure which would normally be used.

*Filling tank 6 with liquid in Figure 1—with pump*

Valve 38 is closed. A source of liquid is attached to coupling 44 and valves 28, 47 and 51 are open. Valves 48, 56 and 64, of course, remain closed. Pump 42 is started and liquid passes through coupling 44, valve 47, check valve 46, strainer 39, pump 42, line 49, line 31, valve 51, line 31, valve 28 and check valve 27 into tank 6.

*Dispensing liquid while employing return line 31 in Figure 1*

Valves 47, 56 and 64 are closed, while valves 28, 38, and 51 are open.

Pump 42 is started and when employing the valve 29 of Figure 5, as shown, lever 121 is moved to press plunger 119 against piston 113 to move 113 and connected parts far enough to open valve 131 and allow liquid 7 to be drawn through lines 32 and 37 into pump 42 and into line 49, where the pressure rises and the liquid flows through line 31 and valve 51 back into tank 6. Upon closing valve 51, pressure in line 49 builds up until relief valve 53 opens, allowing flow of liquid in 52 back into tank 6 and keeping a predetermined pressure in line 49. The pressure in line 49 is transmitted by line 40 to pressure opening 115 of Figure 5 where it acts on piston 113 to hold valve 131 open. When this has occurred the operator may let go of handle 121.

The system is now ready for dispensing liquid and coupling 68 may be secured to a tank into which the liquid is to be dispensed. Upon opening valve 69 and then 64, pump 42 will pump the liquid through lines 49, 63 and 67 to coupling 68 thus dispensing the liquid.

By maintaining a gas in the upper portion of surge chamber 54 the pulsations of pump 42 may be absorbed in the usual manner. Chamber 54 may be dispensed with if desired and if valve 56 is opened to allow the gas in 54 to escape and is then closed chamber 54 will be rendered inoperative.

Pressure relief valve 57 prevents breakage of line 49 but may be eliminated as non-essential in some systems.

Pressure gauge 59 and its safety devices 61 and 62 measure the pressure in pipe 49 but are in no way essential and may be eliminated. Shut-off valve 61 allows removal of pressure gauge 59 and the excess flow valve 62 is merely useful if parts 61 and 59 should be broken away by some force.

*Operation without return line 31 in Figure 1*

The operation is the same without return line 31 if valve 28 is kept closed, provided pump 42 is so constructed that a pressure great enough to open relief valve 57 or to break line 49 cannot be generated, or if dispensing conduit coupling 68 is already in place and valves 64 and 69 are open before starting the pump.

Operation of Figure 2

The valve of Figure 2 operates in the same manner as valve 29 of Figure 1 except that bleed passages 93 and 89 allow the flow of enough liquid so that no manual opening device such as handle 121 is necessary.

In operation, the valve assembly is assembled into a liquefied petroleum gas tank and sealed at threads 73. The discharge of the valve, 84, leads to the suction of pump 42. A small pipe connection 40 and 87 is teed into the discharge of the pump. When the pump is not in operation, no differential pressure exists across the piston and by virtue of the spring loading the valve remains in a closed position so regardless of possible points of pipe line breakage no flow other than that which passes through the small orifice 93 can ensue. Orifice 93, however, will permit the pump suction to be pressured and thereby primed. When the pump is in operation the discharge will create an increased pressure at inlet 87, establishing a differential pressure across the piston and thereby will open valve seat disc 92. This opening should occur with a differential pressure of approximately 10 p. s. i. It is also to be understood that a certain degree of protection (comparable to that of an excess flow valve) is had while the pump is in operation since a breakage on the suction side of the pump would cause a pressure failure at the pump discharge and the pressures would equalize and permit the valve to close. A line breakage on the pump discharge could reduce the outlet pressure of the pump to a point where the valve would close.

Hole 93 is very small so that if 72 breaks away at 74 and breaks at 91 that valve 92 will substantially close tank 6, but enough liquid can pass 93 to prime pump 42 enough to pressure 40 and 88 and open valve 92.

The operation of the valve of Figure 2 is the same as described in Figure 1 except that no manual operation is necessary.

Operation of Figure 3

The operation of Figure 3 is exactly the same as the operation of Figure 1 as push button 109 is equivalent to handle 121 of Figure 1, inlet 111 is connected to pipe 40, outlet 84 is connected to pipe 37 and screw threads 73 replace 34 of Figure 1, placing inlet 83 inside tank 6.

Operation of Figure 5

The operation of the valve shown in Figure 5 has already been described in the operation of Figure 1 above, as the valve of Figure 5 is shown in use in Figure 1. Obviously screw threads 73 of Figure 5 are engaged at 34 of Figure 1.

Inlet 115 is connected to pipe 40 and outlet 84 is connected to pipe 37 of Figure 1.

Operation of all figures

The operation of all figures of the drawing is similar in that each valve is provided with a weakened portion 36 or 74 so that any accidental stresses applied to the outside of the valve housing 29, 72 or 97 will result in breaking off the outside portion and leaving quick closing valve head 92 or 131 substantially closing tank 6 and preventing egress of liquid. Valve 131 completely closes the opening, as shown in Figure 5, and valve 92 of Figures 2 and 3 substantially close the opening as very little liquid will bleed out opening 93.

It is believed obvious, therefore, that I have devised a system and a valve for use in said system capable of carrying out the objects of the invention and that various modifications and changes may be made in this system and valve without departing from the scope of my invention which is defined only in the following claims.

Having described my invention, I claim:

1. In combination with a storage tank for a liquefied gas, a liquid gas handling system comprising a pump, a liquid eduction conduit connecting said storage tank to the intake side of said pump, a liquid return conduit connecting the exhaust side of said pump and said storage tank, a quick closing valve in said eduction conduit at a point inside said storage tank, a second valve in said return conduit, a pressure relief valve connecting said return conduit between said pump and said second valve to the atmosphere, a surge tank connected to said return conduit between said pump and said second valve, a pressure gauge, a pressure gauge line connecting said pressure gauge and said return conduit at a point between said pump and said second valve, a dispensing conduit connected to said return conduit between said pump and said second valve and leading to a dispensing end, a liquid feed line connected to said eduction conduit between said pump and said quick closing valve, means biasing said quick-closing valve to closed position, and means for opening said quick closing valve comprising a housing in said eduction line and adjacent said quick closing valve, a piston in said housing disposed to move to open said quick closing valve, and means for so moving said piston comprising a pressure conduit connecting said return line between said pump and said second valve with said housing.

2. In combination with a storage tank for a liquefied gas, a liquid gas handling system comprising a pump, a liquid eduction conduit connecting said storage tank to the intake side of said pump, a liquid return conduit connecting the exhaust side of said pump and said storage tank, a quick closing valve in said eduction conduit at a point inside said storage tank, a second valve in said return conduit, a pressure relief valve connecting said return conduit between said pump and said second valve to the atmosphere, a dispensing conduit connected to said return conduit between said pump and said second valve and leading to a dispensing end, means biasing said quick closing valve to closed position and means for opening said quick closing valve comprising a housing in said eduction conduit and adjacent said quick closing valve, a piston in said housing disposed to move to open said quick closing valve, and means for so moving said piston comprising a pressure conduit connecting said return conduit between said pump and said second valve with said housing.

3. In combination with a storage tank for a liquefied gas, a liquid gas handling system comprising a pump, a liquid eduction conduit connecting said storage tank to the intake side of said pump, a liquid return conduit connecting the exhaust side of said pump and said storage tank, a quick closing valve in said eduction conduit at a point inside said storage tank, a second valve in said return conduit, a dispensing conduit connected to said return conduit between said pump and said second valve and leading to a dispensing end, means biasing said quick-closing valve to closed position, and means for opening said quick closing valve.

4. In combination with a storage tank for a liquefied gas, a liquid gas handling system comprising a pump, a liquid eduction conduit connecting said storage tank to the intake side of said pump, a dispensing conduit connected at one end to the exhaust side of said pump, the other end of said dispensing conduit being adapted to dispense said liquid, a quick-closing valve in said eduction conduit at a point in said storage tank, a surge tank connected to said dispensing conduit, a pressure relief valve connecting said dispensing conduit to the atmosphere upon predetermined pressure therein, a pressure gauge connected to said dispensing conduit, means biasing said quick-closing valve to closed position, and means for opening said quick closing valve comprising a housing in said eduction conduit adjacent said quick closing valve, a piston in said housing disposed to move to open said quick closing valve, and means for so moving said piston comprising a pressure conduit connecting said dispensing conduit and said housing.

5. In combination with a storage tank for a liquefied gas, a liquid gas handling system comprising a pump, a liquid eduction conduit connecting said storage tank to the intake side of said pump, a dispensing conduit connected at one end to the exhaust side of said pump, the other end of said dispensing conduit being adapted to dispense said liquid, a quick-closing valve in said eduction conduit at a point in said storage tank, a pressure relief valve connecting said dispensing conduit to the atmosphere upon predetermined pressure therein, means biasing said quick-closing valve to closed position, and means for opening said quick closing valve comprising a housing in said eduction conduit adjacent said quick closing valve, a piston in said housing disposed to move to open said quick closing valve, and means for so moving said piston comprising a pressure conduit connecting said dispensing conduit and said housing.

6. In combination with a storage tank for a liquefied gas, a liquid gas handling system comprising a pump, a liquid eduction line connecting said storage tank to the intake side of said pump, a dispensing conduit connected at one end to the exhaust side of said pump, the other end of said dispensing conduit being adapted to dispense said liquid, a quick-closing valve in said eduction conduit at a point in said storage tank, means biasing said quick-closing valve to closed position, and means for opening said quick-closing valve comprising a housing in said eduction line adjacent said quick-closing valve, a piston in said housing disposed to move to open said quick-closing valve, and means for so moving said piston.

7. In combination with a storage tank for liquefied gas, a liquid gas handling system comprising a pump, a liquid eduction conduit connecting said storage tank to the intake side of said pump, a dispensing conduit connected to the exhaust side of said pump and having a dispensing end, a shut off valve controlling flow through said eduction conduit to substantially cut off flow in a closed position, means biasing said shut off valve to closed position, a motor connected to open said shut off valve, a pressure relief valve connected to said dispensing conduit, a fluid return conduit connecting said relief valve and said storage tank, and a pressure fluid supply conduit connecting said dispensing conduit and said motor to supply pressure fluid from said pump to open said shut off valve, said pressure relief valve being set to prevent flow from said dispensing conduit into said fluid return conduit until the pressure necessary to actuate said motor to open said shut off valve is generated by said pump in said dispensing conduit.

8. In combination with a storage tank for liquefied gas, a liquid gas handling system comprising a pump, a liquid eduction conduit connecting said storage tank to the intake side of said pump, a dispensing conduit connected to the exhaust side of said pump and having a dispensing end, a shut off valve controlling flow through said eduction conduit to substantially cut off flow in a closed position, means biasing said shut off valve to closed position, a motor connected to open said shut off valve, and a pressure fluid supply conduit connecting said dispensing conduit and said motor to supply pressure fluid from said pump to open said shut off valve.

9. The combination set forth in claim 7 in which auxiliary means is provided to open said shut off valve manually until said pump provides sufficient pressure to open said shut off valve.

10. The combination set forth in claim 8 in which auxiliary means is provided to open said shut off valve manually until said pump provides sufficient pressure to open said shut off valve.

11. In combination with a tank for liquefied gas, a gas handling system comprising an outlet conduit connected to the interior of the tank and extending into the tank, a motor valve comprising a shut off valve in said conduit for controlling flow of fluid therethrough, said shut off valve being positioned inside said tank and connected to said conduit, means inside said tank connected with and biasing said shut off valve to closed position, and a motor mounted outside and connected to said tank by frangible means, said motor being operatively connected to said shut off valve by removable valve operating means, whereby said motor can be broken off and said biasing means inside said tank can immediately bias said shut off valve to closed position automatically, and power supply means connected to said motor for actuating said motor to overpower said biasing means and open said shut off valve.

THEODORE A. ST. CLAIR.

REFERENCES CITED

The following references are of record in the file of this patent:

UNITED STATES PATENTS

| Number | Name | Date |
|---|---|---|
| 646,064 | Baylis | Mar. 27, 1900 |
| 1,897,161 | Endacott | Feb. 14, 1933 |
| 2,177,825 | Grove | Oct. 31, 1939 |
| 2,179,144 | Buttner | Nov. 7, 1939 |
| 2,291,678 | Benz et al. | Aug. 4, 1942 |
| 2,362,724 | Shea | Nov. 14, 1944 |
| 2,384,677 | Hill | Sept. 11, 1945 |